United States Patent [19]

Ogren

[11] Patent Number: 4,462,451

[45] Date of Patent: Jul. 31, 1984

[54] METHOD AND APPARATUS FOR REMOVING TIRES FROM RIMS

[75] Inventor: Robert S. Ogren, Owatonna, Minn.

[73] Assignee: Motor Wheel Corporation, Lansing, Mich.

[21] Appl. No.: 255,787

[22] Filed: Apr. 20, 1981

[51] Int. Cl.$^3$ ............................................. B60C 25/06
[52] U.S. Cl. ................................................ 157/1.17
[58] Field of Search ................. 157/1, 1.1, 1.17, 1.24, 157/1.26, 1.28

[56] References Cited

U.S. PATENT DOCUMENTS

| | | | |
|---|---|---|---|
| 2,316,023 | 4/1943 | Sauer | 157/1.17 |
| 2,367,638 | 1/1945 | McCulloch | 157/1.17 |
| 2,873,795 | 2/1959 | Kleparchuck | 157/1.17 |
| 3,707,179 | 12/1972 | Le Pier | 157/1.17 |
| 3,742,999 | 7/1973 | Myers | 157/1.17 X |

FOREIGN PATENT DOCUMENTS

| | | | |
|---|---|---|---|
| 2323381 | 11/1973 | Fed. Rep. of Germany | 157/1.17 |
| 2242258 | 3/1975 | France | 157/1.17 |

*Primary Examiner*—James G. Smith
*Attorney, Agent, or Firm*—Barnes, Kisselle, Raisch, Choate, Whittemore & Hulbert

[57] ABSTRACT

A tire dismounting method and machine used in dismounting a tire from a rim. The machine has a frame which diametrically spans one side of the rim flange, and engages diametrically opposite portions of the rim flange to restrain movement of said machine axially of the rim, while the rim and tire assembly are supported freely on a surface. A ram is pivotally supported on the frame adjacent one end thereof for orientation of the ram with its axis generally parallel to the rim axis in operation. The ram has a piston with a presser shoe pivotally carried on its free end for movement in a travel path radially outwardly of and adjacent the rim flanges and generally parallel to the rim axis through a working stroke extending axially beyond the remote riom flange. The ram is supported such that the rim axis can move through a range of about 15° from generally parallel to the rim axis to an acute angle intersecting the rim axis on the machine side thereof. The machine includes springs between the ram and frame for yieldingly biasing the ram toward that end limit of its travel generally parallel to the rim axis. A strap coupled between the springs and ram transmits the spring biasing forces and is removable so that the ram may be pivoted to a storage position against the frame. A pair of outriggers may be mounted to the frame for swinging movement between retracted and extended positions.

14 Claims, 19 Drawing Figures

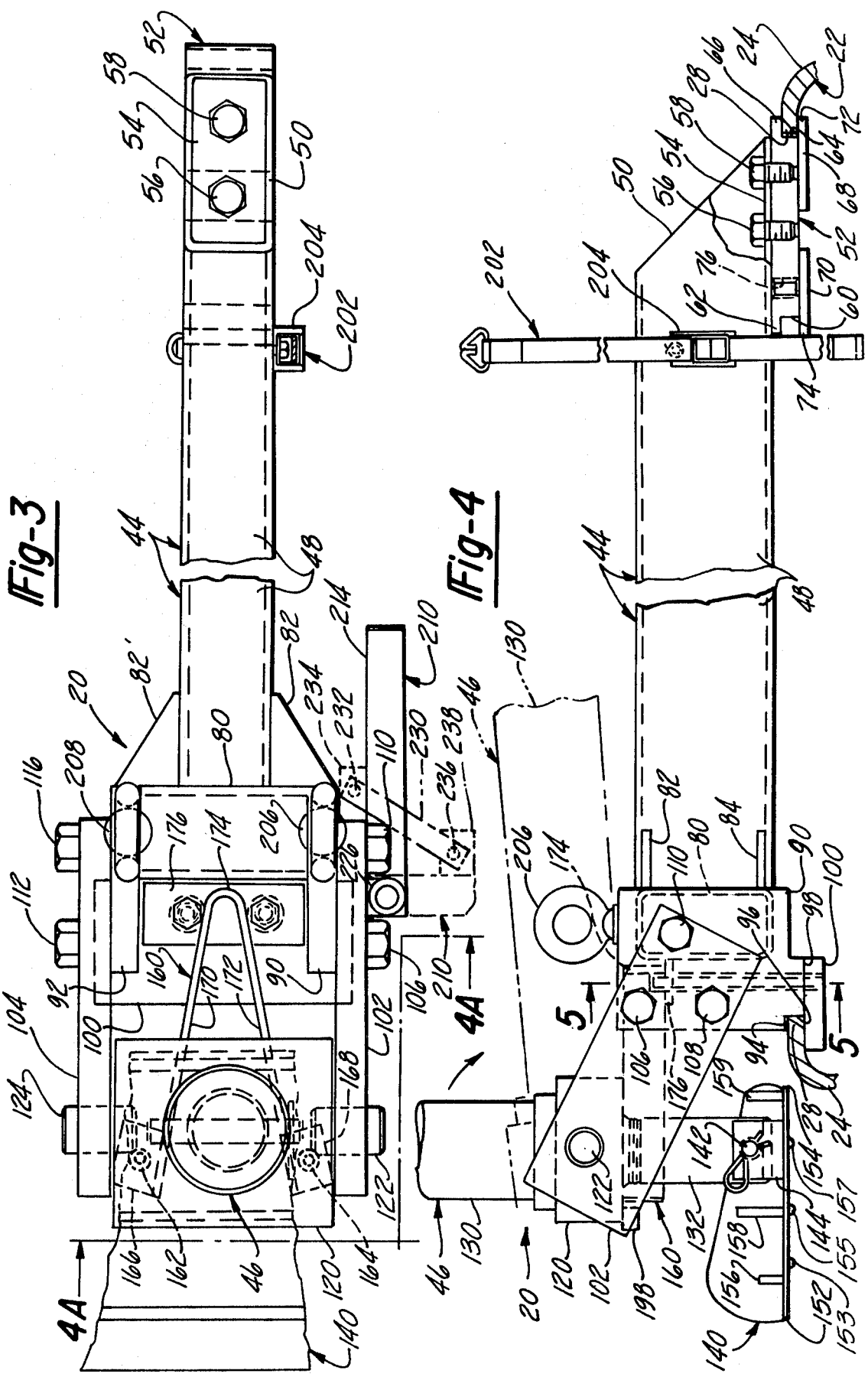

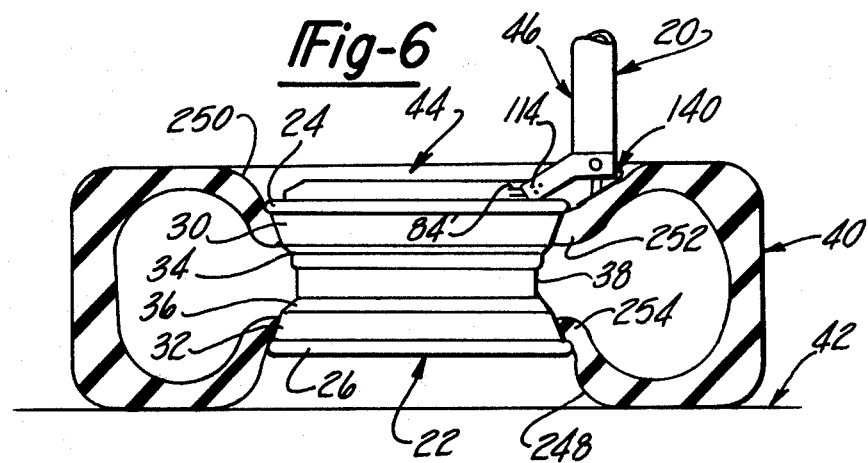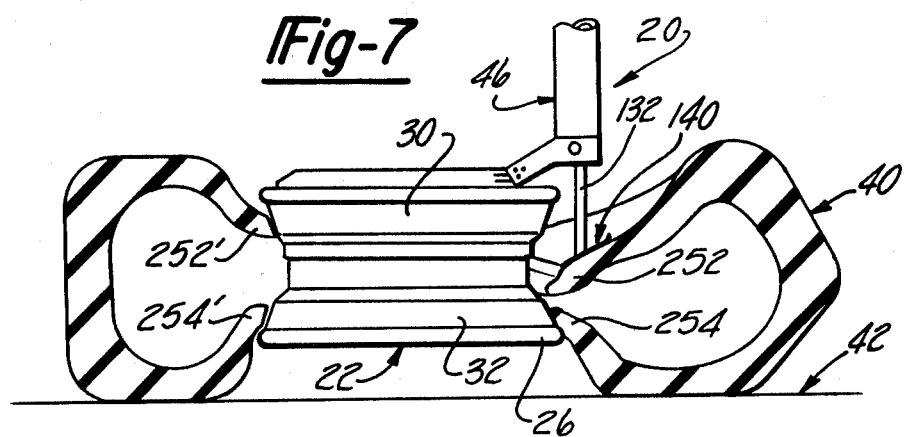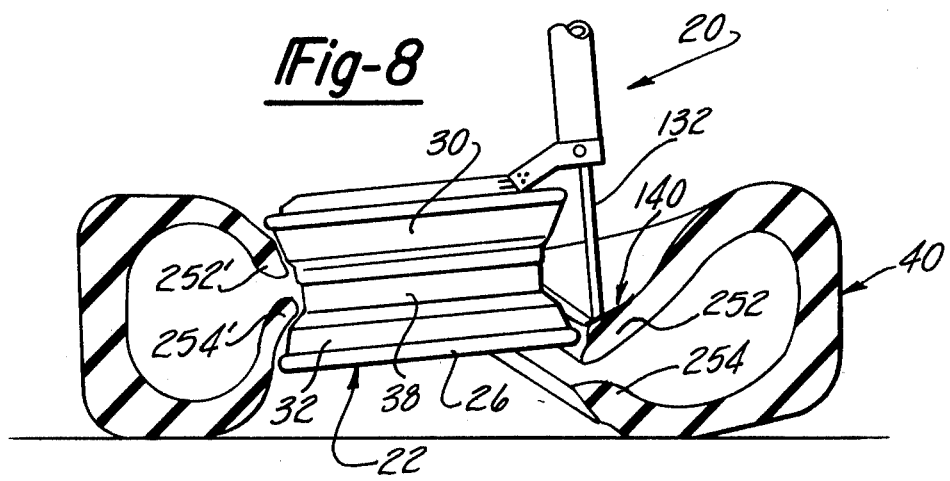

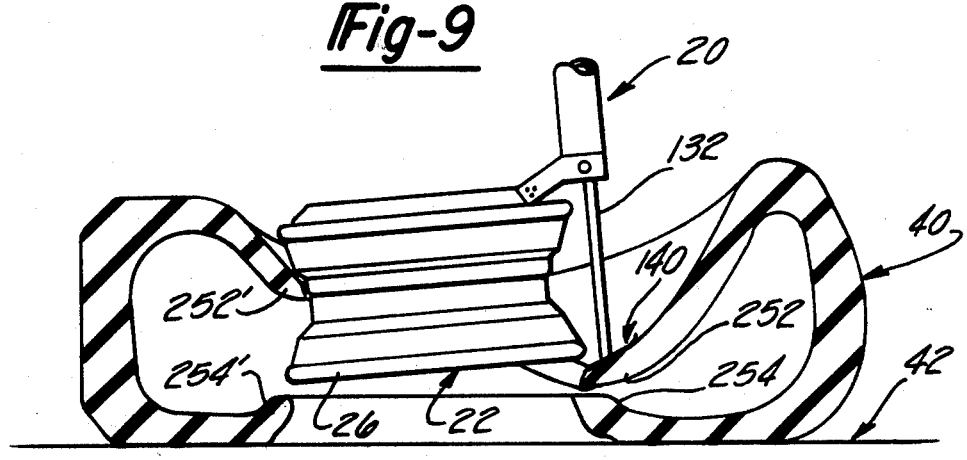
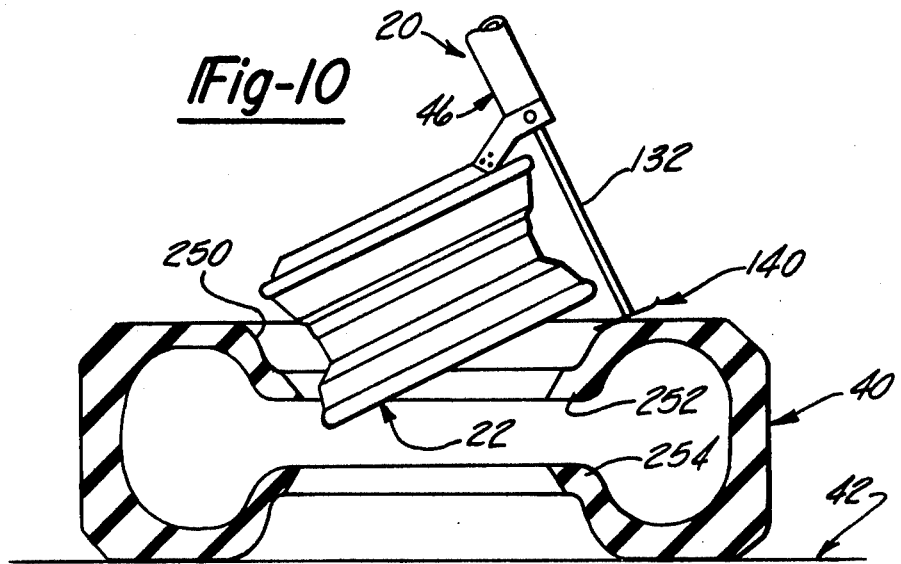

METHOD AND APPARATUS FOR REMOVING TIRES FROM RIMS

This invention relates in general to tire changing methods and equipment, and more particularly to a method and machine for removing or dismounting giant tires from one-piece rims.

Tires and rims are manufactured in many different sizes for utilization with many different types of vehicles. The larger the size of the tire, the more difficult it becomes for a single individual to safely dismount the tire from its associated rim.

Much of the heavy off-the-road transport equipment, such as the tractors and the trucks used at mines and quarries or the larger machines used for earth excavations, utilize so-called giant tires which are large pneumatic tires of the tubeless variety. These tires may range up to twelve feet in diameter and when mounted on their rims weigh over a ton each. The rims alone usually measure in excess of four feet in diameter.

Dual-flanged drop-center one-piece rims, such as commonly used for the pneumatic tires of passenger automobiles, have not until relatively recently been practical for the immense tires (sometimes called "off-the-highway" tires) utilized, for example, on large earth-moving equipment. To remove a tire over the flange of a rim requires drawing the beads out of round, for the bead perimeter is necessarily shorter than the flange perimeter. With the relatively small pneumatic tires used for passenger cars, the force required to deflect a tire bead out of round and, holding it so, to manipulate it over the flange, may safely be applied locally by prying tools, such as tire irons. For much larger sizes of tires, this becomes impossible; the tire beads are reinforced with heavy wire, and hitherto it has been accepted that rubber and cord materials could not withstand proportionally larger forces if applied locally, as with prying tools.

At present, the general practice still is to mount and dismount such large tires upon multi-piece rims. The multi-piece construction enables the rim to be disassembled so that it may be removed from within a giant tire with relative ease. However, to attach and remove the removable rim flange with its attendant parts is a slow procedure.

Large one-piece rims have become available in recent years and have seen limited use for installation in giant tires which are manufactured with slight modifications to accommodate such rims. While these rims, which are known as one-piece drop-center rims, eliminate rim assembly problems, they present problems of a different character, the most significant of which is the difficulty in giant tire mounting and dismounting. Due to their extreme weight and large size, these tires are extremely difficult to manipulate over the one-piece rims. The problem is compounded by the fact that the side walls of such tires are quite thick and relatively rigid so they are not easily maneuvered over the flanges on the one-piece rims. Thus, for extremely large industrial tires, heavy expensive equipment and a multitude of personnel have been required in order to complete a dismounting operation.

With the large single piece rims it is common, in fact it is necessary, when dismounting extremely large diameter tires on such rims, to employ large pieces of hydraulic equipment. However, for those off-highway tires in the range of sizes such as are commonly utilized for tractors, heavy trucks, construction vehicles, and mining vehicles, dismounting at on-site or remote areas must often be accomplished without the benefit of fancy equipment. Use of such equipment and personnel is highly impractical in remote locations where one frequently finds the necessity for dismounting the tires. It is simply too impractical and costly to ship such tires and rims back to a central garage or tire handling facility where the large equipment might be available.

Although there have been developed over the years a multitude of hand tools and hydraulic tools for dismounting both tube-type and tubeless-type pneumatic tires from one-piece drop-center rims in the sizes customarily for highway passenger car use, such as the tire dismounting tool shown in U.S. Pat. No. 2,920,688, such existing equipment and procedures have generally been found to be ill-adapted to the dismounting of the aforementioned larger off-highway tires from single-piece rims. Instead, the approach over the last ten or fifteen years has been to provide large and relatively expensive machinery for fixturing the rim and manipulating the off-highway tire in various ways to dismount the same from the rim. Examples of this approach to the problem are found in U.S. Pat. Nos. 3,489,198; 3,612,140; 4,014,375; 4,031,941; 4,093,015 and 4,163,468, all of which show the "Malinski" approach, as well as other approaches shown in U.S. Pat. Nos. 2,568,874; 2,795,268; 2,873,795; 2,906,321 and 3,942,575.

Hitherto there have been no simple and relatively inexpensive tools available which permit one person to more easily and economically dismount such large off-highway tires from single-piece rims. It may therefore be appreciated that a great need exists for a versatile and convenient tool which permits a single individual to on-site dismount large diameter off-highway tires from their associated single-piece rims.

Accordingly, an object of the present invention is to provide an improved method and apparatus which permits a single individual to dismount large tires from their associated rims which overcomes all of the disadvantages noted above with respect to the prior art.

More particularly, one of the principal objects of the present invention is to provide a machine which is capable of removing a giant tire from a one-piece drop-center rim in matter of minutes and with a minimum amount of manual labor. Another object is to provide a machine of the type stated which is simple in construction and durable. A further object is to provide a machine of the type stated which greatly reduces the chance of damaging the giant tires or the rims during removal.

Other objects of the present invention are to provide a new procedure and apparatus which makes it more feasible to use dual-flange drop-center rims for such large size pneumatic tires; which avoids imposing excessive prying forces on localized portions of the tire beads; which forces the tire out of round against distributed resistance, rather than by locally excessive prying forces; and which manipulates the beads gently over the rim flange. Further purposes are to provide apparatus by which one man can easily dismount such massive tires using dual-flanged drop-center rims.

A still additional object of the present invention is to provide a large-tire dismounting device which is portable and therefore may be easily transported to and utilized in remote areas.

A further object of the present invention is to provide apparatus for dismounting large, off-highway tires which is extremely versatile in enabling a wide range of tire and rim sizes to be accommodated, and which is simple in construction and is therefore durable and amenable to inexpensive manufacture.

Another object of this invention is to provide a tool which may be constructed from conventional, readily available components, and which is durable.

Other objects, features and advantages of the present invention will become apparent from the following detailed description taken in conjunction with the accompanying drawings, which are drawn to scale, and wherein:

FIG. 3 is a fragmentary top plan view of the tool of FIGS. 1 and 2 with the single ram shown at an upright position in its operative swing path.

FIG. 4 is a fragmentary side elevational view of the tool as shown in FIG. 3 mounted on the ram as in FIG. 1.

FIGS. 6 through 10 are side elevational views of the tool and rim of FIGS. 1 through 5 shown in operable association with a large off-highway tubeless tire of bias-type construction and illustrating in sequence the successive method steps and tool mode of operation involved in dismounting such a tire from the rim in accordance with the present invention.

Figure 11:
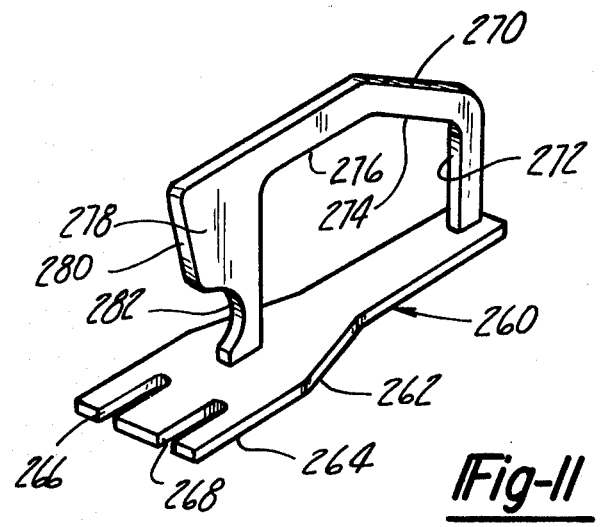
FIG. 11 is a perspective view of a tire bead positioning tool employed as a supplement to the tire dismounting tool and method of the invention in the case of giant tires of radial type construction.
Figure 11A:
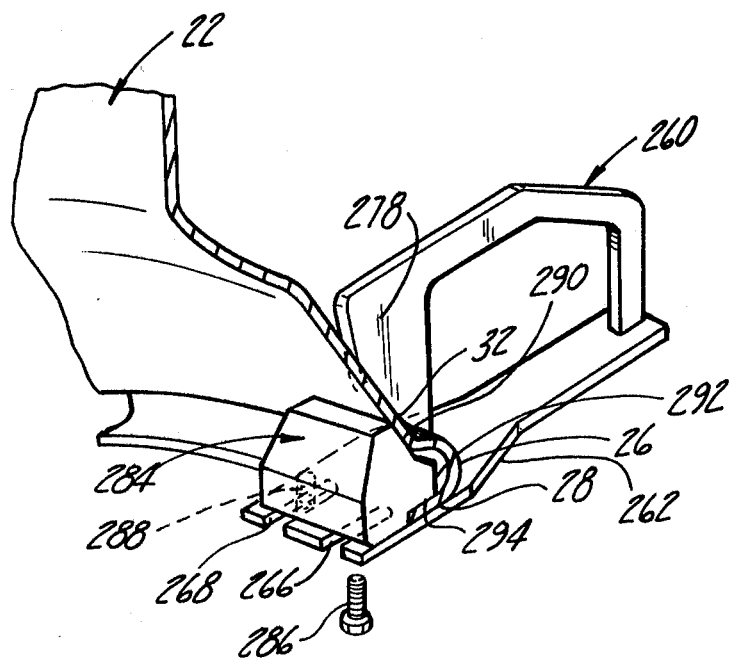
FIG. 11A is a fragmentary perspective view illustrating the tool of FIG. 11 mounted to a rim.
Figure 12:
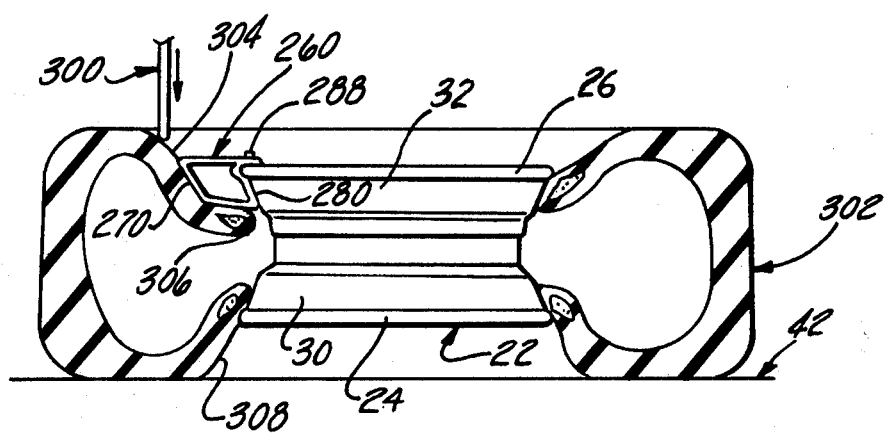

FIGS. 12 through 17 are side elevational views of the tool and rim of FIGS. 1-5 shown in operable association with a large off-highway tubeless tire of radial-type construction and illustrating in sequence the successive method steps and tool mode of operation involved in dismounting such a radial tire from the rim in accordance with the present invention, and also illustrating an additional power boom assist tool and associated bead positioning tool of FIGS. 11 and 11A employed for this purpose.

Figures 1, 5:
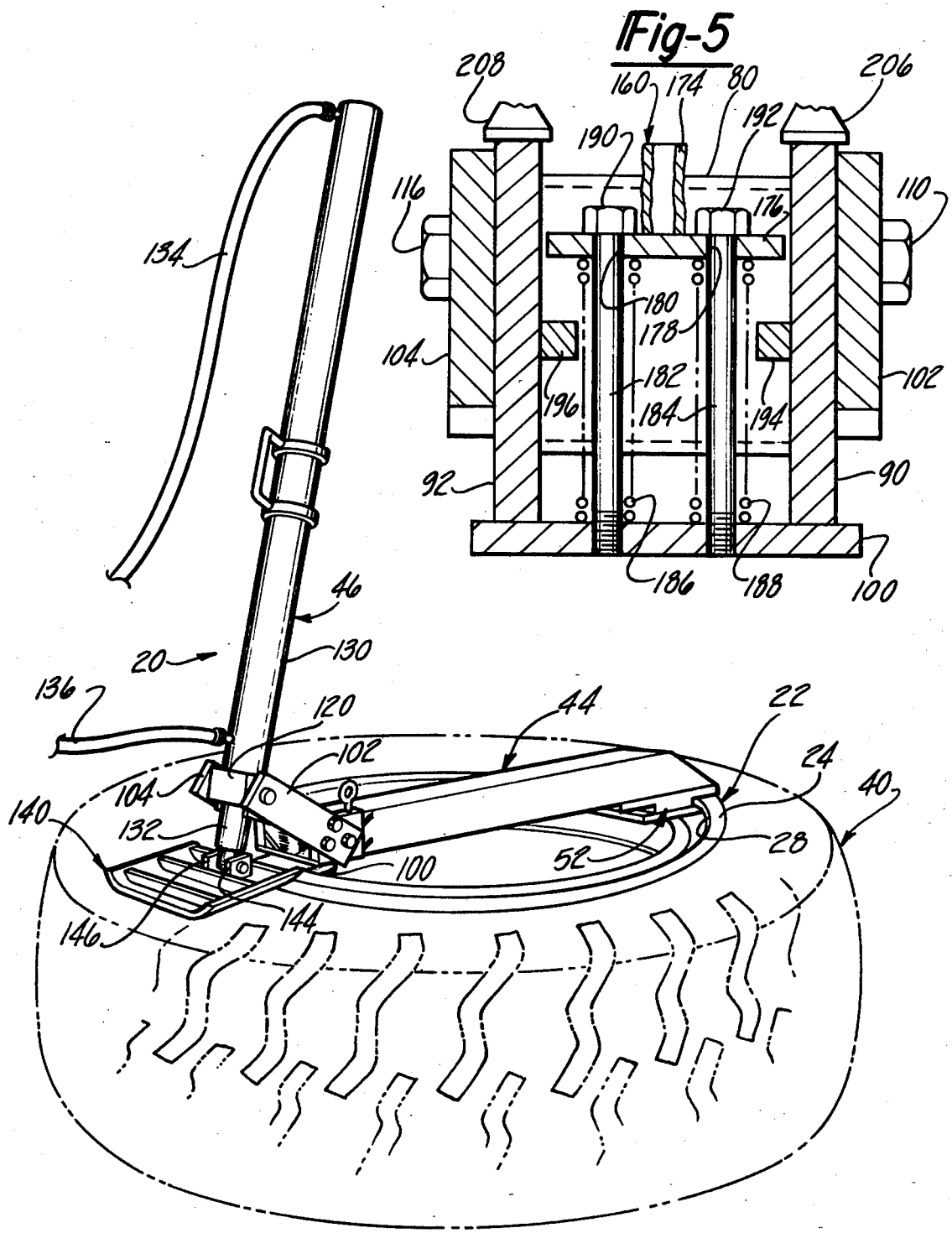
FIG. 1 is a perspective view of an exemplary but preferred embodiment of a tire dismounting tool constructed in accordance with the present invention, and shown installed on a single-piece, dual-flanged off-highway rim, and with the tool shown in retracted start position.
FIG. 5 is a vertical sectional view taken on the line 5—5 of FIG. 4.
Figure 2:
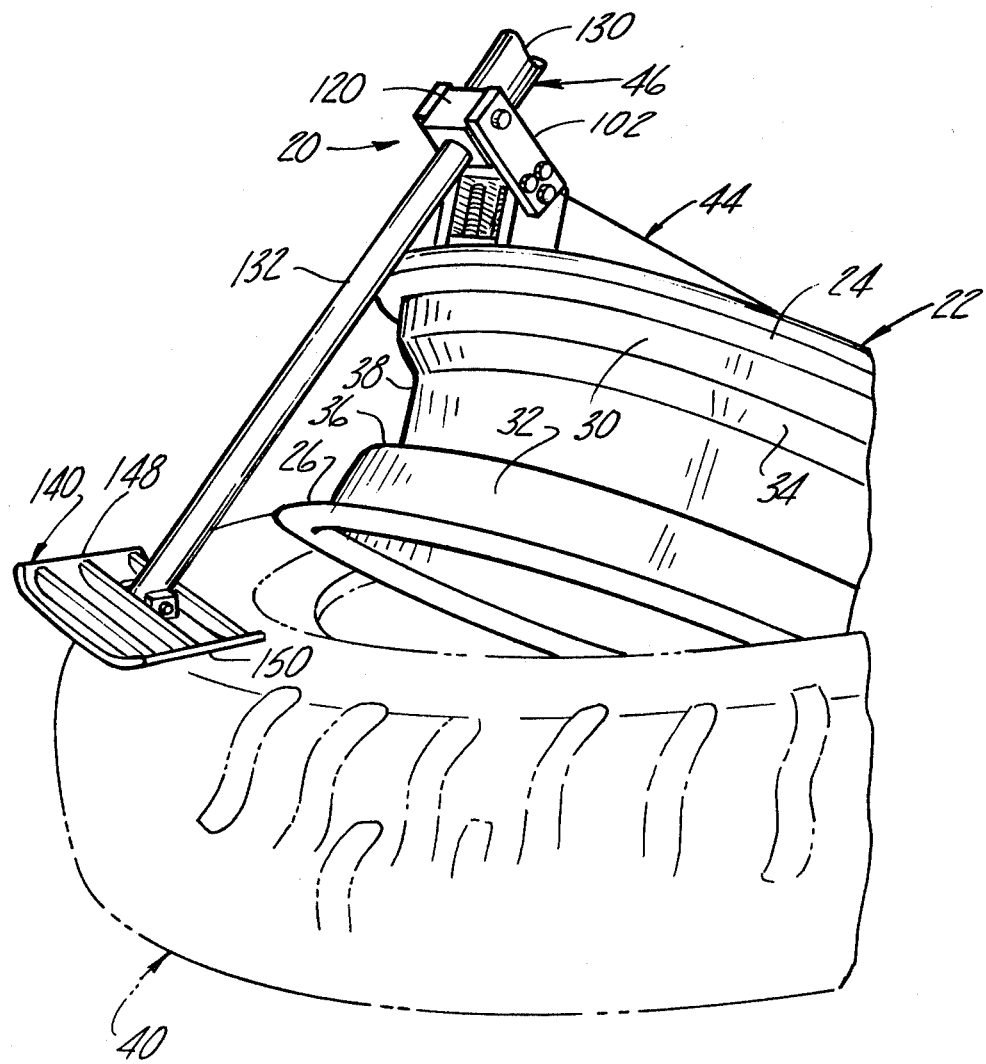
FIG. 2 is a view similar to that of FIG. 1 but showing the tool with its single, pusher piston moved through its working stroke to its opposite limit of travel relative to FIG. 1.

Referring in more detail in FIG. 1, one embodiment 20 of a tire removing or dismounting apparatus of the present invention is shown mounted upon one side of a large-size dual-flanged off-highway rim 22. The configuration of rim 22 is somewhat similar to that of the drop-center rims conventionally used for tires of passenger automobiles, but differs in several respects therefrom. As best seen in FIG. 2, as well as FIGS. 6-10, the dual flanges 24 and 26 of rim 22 have outer rounded edges with a re-entrant lip 28 (see also FIG. 4) which protrudes radially inwardly towards the axis of the rim.

The dual bead-seating portions 30 and 32 of rim 22 taper slopingly inwardly at an angle approximately 15° relative to the rim axis and end in more steeply sloping sides 34 and 36 respectively, which in turn extend to both sides of the drop-center portion 38 of the rim.

The tire dismounting apparatus of the present invention more particularly comprises a hydraulically actuated tire dismounting tool 20 constructed as a unitary, portable, fold-up assemblage adapted to rest upon the upwardly facing side of rim 22 and to fixture itself thereupon in operation with the rim initially in fully mounted engagement with a matching, giant-size tire 40. The axially opposite, downwardly facing side of rim 22 is held spaced above the ground, floor or other similar flat supporting surface 42 (FIG. 6) by tire 40, with the downwardly facing side of tire 40 resting freely upon surface 42 in an unfixtured condition.

Tool 20 includes a main frame 44 adapted to diametrically span rim 22, and a double acting hydraulic ram 46 pivotally mounted to one end (hereinafter termed the "forward" end) of frame 44. Main frame 44 comprises a hollow rectangular tube 48, the aft end of which is cut off on a bias to provide sloping side wall edges 50 (FIGS. 3 and 4). An adjustable rim clamping block 52 is mounted to the underside of the bottom wall 54 of tube 48 at the aft end thereof by a pair of threaded studs 56 and 58. Block 52 has a downwardly facing notch 60 extending across its forward end defined by an overhanging lip 62, and a similar notch 64 and overhanging lip 66 at its aft end. As shown in FIG. 4, lip 66 rests upon the re-entrant lip 28 of rim 22. A pair of rim clamping plates 68 and 70 are secured to the underside of block 52. The after edge 72 of plate 68 protrudes beyond the vertical face of notch 64 to define with lip 66 a rim lip engaging groove, with plate edge 72 being disposed beneath rim lip 28. Likewise, the forward edge 74 of plate 70 protrudes past the vertical face of notch 60 so as to define with lip 62 an alternate rim lip engaging groove. Block 52 is adapted to be pivoted about the axis of stud 56, when the same has been loosened and stud 58 has been withdrawn upwardly out of engagement with block 52, so that block 52 can be disposed with its longitudinal dimension oriented perpendicularly to the plane of the drawing in FIG. 4 so as to be disengaged from and clear of rim lip 28. In addition, block 52 is provided with a third threaded hole 76 aligned in a row with the holes receiving studs 56 and 58. Hole 76 is adapted to threadedly receive stud 58 when block 52 is pivoted 180° stud 56 from the position shown in FIG. 4. Notch 60 is spaced a greater predetermined distance from the axis of stud 56 than notch 64 to provide a size selection for mounting tool 20 to two different standard sizes of rims.

The pivotal support and spring biasing structure for ram 46 is located at the forward end of main frame 44. This structure includes a hollow rectangular tube 80 welded across and to the forward end edges of tube 48 so as to extend with its axis perpendicular to that of tube 48. Tube 80 is braced by two pairs of gussets 82,84 and 82',84' welded to tube 80 and tube 48 as shown in FIGS. 3 and 4. A pair of heavy, upright plates 90 and 92 are welded one to each of the opposite ends of tube 80 and protrude forwardly therefrom. As shown in FIG. 4, the forward lower corner of each plate 90,92 is notched to provide a horizontal seating surface 94, adapted to rest upon the rim lip 28, and a vertical surface 96 adapted to abut the inner periphery of lip 28. The lowermost edges 98 of each plate 90,92 have welded thereto a fixturing plate 100 which spans across and protrudes at its forward edge beyond plates 90,92 so as to underlie rim lip 28 in the operative, fixtured position of tool 20 on rim 22.

Plates 90 and 92 individually support a pair of forwardly ard upwardly inclined plates 102 and 104 respectively which serve as arms for pivotally carrying the ram 46. Each arm plate 102,104 is secured by three studs 106,108,110 and 112,114 and 116 to plates 90 and 92 respectively. The forwardly protruding ends of arm plates 102 and 104 flank the sides of cylinder end cap pivot block 120 of ram 46. Plates 102,104 and block 120 have registering apertures receiving co-axial pivot pins 122 and 124 respectively which pivotally support ram 46 for swinging movement about an axis perpendicular to the longitudinal axis of the main frame 44 and to the axis of rim 22 in the fixtured condition of tool 20 on rim 22.

Ram 46 preferably comprises a single-piston, single-cylinder double-acting-type ram with a hydraulic cylinder 130 mounted at its lower end in cap block 120, and a rod 132 connected to the ram piston slidably extends downwardly through block 120. Cylinder 130 has a forward-stroke working chamber at its upper end fed from a conventional hydraulic system source of hydraulic pressure fluid via a pressure hose line 134, and at its lower end has a retraction-stroke working chamber fed via hydraulic pressure fluid line 136. Lines 134 and 136 are connected to a fluid source which includes a conventional hydraulic pump and associated control system (not shown). In one working example, the hydraulic system is designed to supply hydraulic fluid at a maximum pressure up to 3,000 p.s.i. and ram 46 has a maximum working capacity of 36,000 pounds of force on the downward, forward working stroke.

The lower end of piston rod 132 is pivotally connected to a tire pressing shoe plate 140 via a pivot pin 142 extending through lower end of rod 132 perpendicular to the rod axis and through aligned apertures in a pair of clevice plates 144 and 146. Plates 144,146 are welded to the upper surface of plate 140 midway between the upwardly curved side edges 148 and 150 of plate 140 and are offset aft from the fore and aft center of plate 140 by about ¼ of the distance between the forward and aft edges 152 and 154 of the plate. Plate 140 is braced by three plates 156,158 and 159 extending lengthwise between plate edges 148 and 150 and welded along their bottom edges to the upper surface of the plate. Preferably, plate 140 is dimensioned such that the distances between the fore and aft edges 152 and 154 and between side edges 148 and 150 are about 10" and 26" respectively. Preferably, three parallel tire-gripping ridges 153,155 and 157 (FIG. 4) are provided on the tire-engaging side of plate 140 so as to extend between but terminate short of the plate side edges 148 and 150. Ridges 153,155 and 157 may consist of weld beads and serve to prevent or reduce slippage of plate 140 along the tire sidewall during operation of tool 20.

When tool 20 is completely fixtured on rim 22 and set up for operation as shown in FIGS. 1–4, ram 46 is yieldably biased toward an upright vertical orientation with its axis parallel to the axis of rim 22 by a spring biasing and limit stop structure best seen in FIGS. 3, 4 and 5. This includes abutment arm means in the form of a V-shaped strap 160 removably mounted to the underside of cylinder cap 120 by a pair of socket head studs 162 and 164 extending through associated mounting ears 166 and 168 welded respectively to the outer side edges of a pair of divergent legs 170 and 172 of strap 160 (FIG. 3). The forward ends of legs 170 and 172 straddle the piston rod 132, and the aft ends of legs converge at an apex portion 174 disposed between plates 90 and 92 just forwardly of tube 80. Strap apex 174 rests upon the upper surface of a floating plate 176 which has a pair of spaced apertures 178 and 180 through which extend the shanks of a pair of upright studs 182 and 184 respectively. Studs 182 and 184 are threadedly secured at their lower ends in associated threaded apertures in plate 100 and a pair of compression coil springs 186 and 188 individually encircle the shanks of studs 182 and 184. Springs 186,188 bottom at their lower ends upon fixed plate 100 and at their upper ends against the under surface of floating plate 176.

Plate 176 can move vertically on studs 182 and 184 between an upper travel limit wherein plate 176 abuts the underside of the heads 190 and 192 of studs 182 and 184 respectively, and a lower travel limit wherein plate 176 rests upon a pair of stops 194 and 196 (FIG. 5) welded to the facing sides of plates 190 and 192 respectively. Springs 186 and 188 are under compression throughout such travel of plate 176 and are sized so as to exert via plate 176 and strap 160 a yieldable biasing force on ram 46 tending to pivot it in a counter clockwise direction as viewed in FIG. 4 on pivot pins 122,124. Normally, ram 46 is thus yieldably maintained upright with its cap block 120 abutted against a pair of stops 198 and 200 (FIGS. 4 and 4A) which are welded respectively to the facing sides of arms 102 and 104 near the outer ends thereof. When ram cap 120 is in abutment with stops 198,200, plate 176 is spaced just slightly below the stud heads 190,192. The spacing of stops 194,196 below stud heads 190,192 is such that ram 46 can pivot clockwise as viewed in FIG. 4 so as to tilt aft through an angle of 15° from its upright position against the biasing force of springs 186 and 188 to a rearwardly inclined position, as indicated in FIGS. 1 and 2. The positive end limits of this pivotal motion of ram 46 is thus established by stops 198,200 and stops 194,196 respectively.

To facilitate storage, transport and handling of tool 20, ram 46 may be pivoted further clockwise, as viewed in FIG. 4, beyond its 15° inclined operational limit. This is accomplished by unscrewing screws 162 and 164 to thereby detach strap 160 from beneath cap 120 and then removing the strap from tool 20. Ram 46 then can be pivoted on pins 122,124 to a horizontal position extending parallel to longitudinal axis of frame 44, as indicated by the solid and phantom line positions of ram 46 in FIG. 4. Ram 46 may be securely retained in this collapsed, compact position by means of a flexible strap 202 which is threaded through a commercially available cam buckle 204 bolted to one side of tube 48 near the aft end thereof (FIGS. 3 and 4). Handling of tool 20 is also facilitated by a pair of hoisting eyes 206 and 208 threadably secured into the upper edges of plates 90 and 92, the eyes being located at the center of gravity of tool 20 when ram 26 is in its collapsed storage position.

Figure 4A:
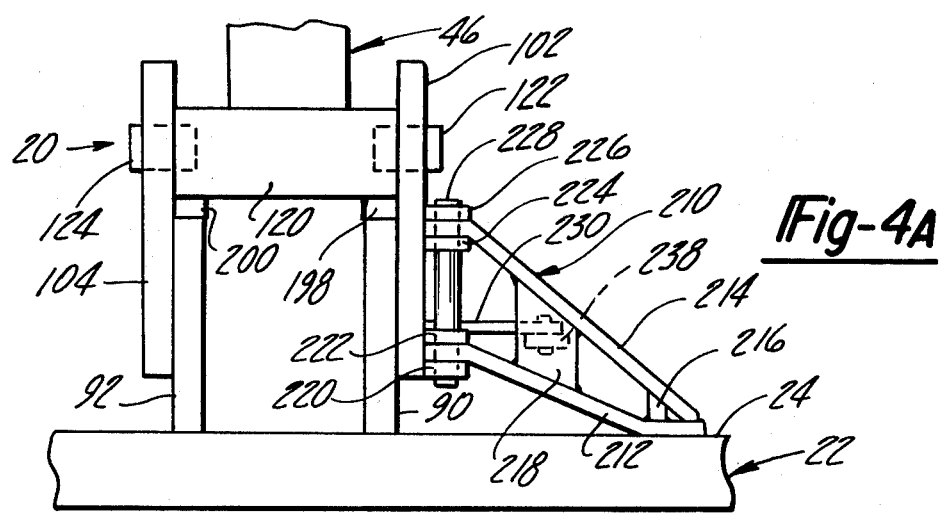
FIG. 4A is a fragmentary elevational view, with some detail omitted, taken on the offset line 4A—4A of FIG. 3 with one of two optional outrigger braces shown on the tool in swung-out position.

If desired, tool 20 may also be equipped with a pair of stabilizing outriggers 210, only one of which is illustrated in FIGS. 3 and 4A. The outrigger 210 as illustrated comprises the right hand outrigger as viewed in its swung-out bracing position in FIG. 4A. Outrigger 210 comprises an inclined arm made up of a lower leg 212 and an upper leg 214 which converge at their outer ends and which are braced by webs 216 and 218 welded thereto and extending therebetween. The vertically spaced inner ends of legs 212 and 214 slip between lower and upper pairs of vertically spaced bracket ears 220,222 and 224,226 respectively which are welded to the outer side of arm plate 102. A pivot pin 228 is received through registering co-axial apertures in the bracket ears 220,222,224,226 and in the inner ends of legs 212 and 214 and retained by snap rings (not shown) to pivotally mount arm 210 to frame 44. Outrigger 210 thus may be swung about the vertical axis of pin 228 from a retracted storage position shown in solid lines in FIG. 3 outwardly through an angle of about 90° to an extended position shown in phantom in FIG. 3 and in solid lines in FIG. 4A.

Outrigger 210 may be locked in its bracing position by a removable strut 230 (shown in phantom in FIG. 3 and in solid lines in FIG. 4A). The inner end of strut 230 is pinned at 232 to a lug 234 welded to the rear edge of plate 90, and the outer end of strap 230 is pinned at 236 to a lug 238 welded to web 218. When it is desired to swing arm 210 to its storage position, pins 232 and 236 are removed to disconnect strut 230 from the tool. An identical left hand outrigger arm (not shown) is mounted to the arm 104 in mirror image fashion to outrigger 210, and hence not further described herein. The left and right hand outrigger arms are adapted to rest upon the upper surface of rim lip 28 when the surfaces 94 of plates 90 and 92 likewise rest upon rim lip 28, the outrigger arms thus bracing tool 20 against tipping forces during operation of tool 20.

The method of dismounting a giant tire of bias-type construction, and the mode of operation of tool 20 for performing the method of the invention, will best be understood by referring to the sequence of tire dismounting steps illustrated successively in FIGS. 6 through 10, as supplemented by the views of FIGS. 1 and 2. The procedure starts with placement of tire 40, with rim 22 mounted therein as shown in FIG. 6, so that one side wall 248 of the tire is laying flat on the flat horizontal supporting surface 42, the tire being fully deflated and resting freely in an unfixtured condition on this supporting surface. Tool 20 is then lifted via hoist ears 206,208 over the upper side of rim 22, preferably by use of the hydraulic boom of a service truck, or if in a service shop, by use of an overhead chain fall hoist or the like. With fixturing block 52 pivoted so as to extend perpendicularly to tube 48, as described previously, tool 20 is lowered to bring fixturing surfaces 94,96 and plate 100 into seating engagement with a portion of the rim lip 28, as best seen in FIG. 4. Then the aft end of tool 20 is lowered until notch 64 of block 52 is aligned with a portion of rim lip 28 diametrically opposite that engaged with the forward end of the tool, whereupon block 52 is pivoted to the position thereof shown in FIG. 4 so as to nest rim lip 28 between lip 66 of block 52 and plate 70. Block 52 is then fixed in this position by inserting stud 58 through frame wall 54 and screwing the stud 58 into the aligned threaded aperture in block 52, and also tightening stud 56.

Next the left and right hand outrigger arms 210 are swung out to their spread-apart positions and locked in place by installing the associated struts 230 as described previously. The hydraulic lines 134 and 136 are then connected to the hydraulic pump and control system. Ram 146 is unlocked from its aforementioned collapsed storage position by unfastening strap 202 therefrom, and then ram 46 is lifted to pivot it to its full-upright position shown in FIG. 4. Strap 160 is installed beneath ram block 120 with the apex 174 of the strap overlying and resting upon spring plate 176 to thereby stabilize ram 146 in its upright position. It is to be understood that up to this point, piston rod 132 and the tire pressing shoe 40 carried thereby are in their fully retracted positions.

To start the tire dismounting sequence, the hydraulic system control valve is actuated to admit hydraulic fluid under pressure to the forward stroke working chamber of ram 46 via line 134, the retraction chamber of the ram being bled back to the source via line 136 under this condition. At the start of this sequence, shoe 140 will be resting lightly against the subjacent portion of the upwardly facing side wall 250 of tire 40, and will pivot on rod 132 so as to lay flat against the inclined sidewall. As power is applied to ram 46 and piston rod 132 begins its descent on its working stroke, shoe 140 will begin to deflect the engaged portion of side wall 250 downwardly as illustrated generally in FIG. 6. As shoe 140 is forced further downwardly the portion of the upper bead 252 of tire 40 beneath and in the vicinity of either side of shoe 140 will be forced off its associated rim seat 30 and moved downwardly, axially of rim 22, toward the other bead seat 32 generally as illustrated in FIG. 7. This will simultaneously pull the diametrically opposite portion 252' of tire bead 252 downwardly along its rim seat 30, as indicated in FIG. 7, until the entire upper bead 252 has been distorted and drawn into the vicinity of the drop center portion 38 of the rim.

In accordance with one feature of the invention, ram 46 will pivot within the aforementioned 15° range against the bias of springs 186, 188 in response to moment reaction forces exerted on the ram by tire 40 via shoe 140 during movement of piston rod 132 on its working and retraction strokes. This relieves the ram components of bending stresses, and also optimizes application of tire bead stripping forces to tire 40 during the dismounting sequence.

Further continued downward extension of piston rod 132 and shoe 140 will force the adjacent portion of tire bead 252 into contact with subjacent portion of the lower tire bead 254, whereupon the forces applied by ram 46 are transmitted through bead 252 to such engaged portion of lower bead 254 so as to push the same over the lower rim flange 26. As this is occurring the stresses imposed upon tire 40 are transmitted therethrough to also cause the diametrically opposite portion 254' of lower tire bead to be pulled downwardly off of its rim bead seat 32 and into the vicinity of the drop center portion 38 of the rim generally as illustrated in FIG. 8. Downward extension of piston rod 132 is thereafter continued to cause shoe 140 to force the lower bead 254 over rim flange 26 until it is completely peeled thereover and falls off of rim 22, as illustrated in FIG. 9.

Still further extension of piston rod 132 on its working stroke then forces upper tire bead 252 over the lower rim flange 26 until the rim 22 is lifted substantially free of tire 40. At the completion of the working stroke of ram 46, shoe 140 rests upon the upper side wall 250 and rim 22 rests on a portion of upper bead 252 in upwardly inclined attitude generally as illustrated in FIG. 10.

It is to be understood that the foregoing sequence of "downward" motions of shoe 140 and ram 46 is to be considered as describing relative motion with respect to rim 22. Thus, with reference to the supporting surface 42, the motion of rim 22 is entirely in an upward direction away from surface 42. Thus, tool 20 actually operates to strip rim 22 upwardly from tire 40 while lifting the same therefrom with reference to surface 42.

Once rim 22 has been substantially freed from tire 40, as illustrated in FIG. 10, the hydraulic controls are actuated to admit working fluid into the lower retraction chamber of ram 46 via line 136, and to bleed pressure fluid from the upper working chamber of the ram via line 134, whereupon piston rod 132 is retracted along with shoe 140 back to the starting position illustrated in FIG. 4. As this occurs, rim 22 will be dropped slightly to rest freely on tire 40. If desired, tool 20 can then be hoisted with rim 22 still attached thereto, moved clear of tire 40 and brought to rest on the floor 42. Tool 20 is then detached from rim 22 by reversing the fixturing procedure described previously.

The foregoing method steps and tool operation procedures have been found to be sufficient, without further manual or power tool assistance, to dismount the above-described giant tire if the same is of bias-type construction. However, with respect to giant tires of radial-type construction, it is presently preferred to provide the additional assist device and further manipulative steps illustrated in FIGS. 11-17.

Referring first to FIG. 11, a bead positioning tool 260 is preferably provided for temporarily holding a portion of one of the tire beads displaced off of its associated rim bead seat. Tool 260 comprises a plate 262 which, in one working example, measures about 19" long and which is cut at one end to flare outwardly into a wider portion 264 measuring approximately 5" across. A pair of parallel slots 266 and 268 are cut into the end edge of the widened portion 264. A generally C-shaped frame member 270 is welded to one side of plate 262 and consists of a first leg 272 extending perpendicularly from the narrow end of plate 262, an inclined tire-side-wall-engaging leg 274, a strut 276 and a rim engaging portion 278 welded at its end to the surface of end portion 264 of plate 262 between the slots 266 and 268. Leg 278 is contoured along its outer edge so as to conform to the profile of rim bead seat 32 and the associated rim flange 26. Leg 278 thus has an inclined edge 280 adapted to lay against rim bead seat 32 and a curved notched portion 282 adjacent plate 262 adapted to receive rim flange 26.

As best seen in FIG. 11A, tool 260 also includes a clamping block 284 having a pair of threaded holes adapted to threadedly receive studs 286 and 288 inserted respectively through slots 266 and 268 of plate 262 to adjustably clamp block 284 to the plate adjacent to, but spaced from, leg 278 of the tool. Block 284 is contoured along its side facing leg 278 so as to have an inclined portion 290 matching the profile of the inner periphery of rim bead seat 32, a protruding portion 292 adapted to fit into the profile of the inner periphery of rim bead flange 26 and a notched portion 294 which cooperate with the facing surface of plate 262 to receive the rim lip 28 therebetween in clamping relationship when studs 286,288 are tightened down.

The other additional step and assist device preferably employed with dismounting giant tires of radial-type construction is the use of some convenient power means for applying downward force on a portion of the side wall of tire 22 and capable of temporarily holding the same in a displaced position. Such power assist can be conveniently supplied by using the hydraulically powered hoist boom customarily available on conventional tire service field trucks, the free end of such boom being schematically illustrated at 300 in FIGS. 12-15.

Figure 13:
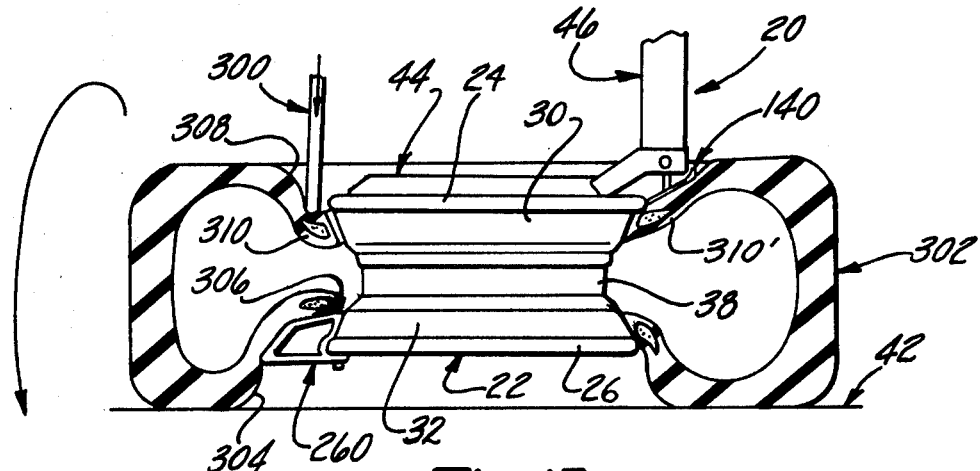

Referring in sequence to FIGS. 12-16, the modified method of the invention, and the use of the additional assist devices 260 and 300 in conjunction with tire dismounting tool 20, are illustrated in conjunction with the dismounting of a giant tire 302 of radial-type construction. The first step in this modified method is to rest tire 302 horizontally with rim 22 mounted therein, so that one side wall 308 lays freely on the floor surface 42. With tire 302 in fully deflated condition, power boom 300 is engaged with the upwardly facing side wall 304 of tire 302 and actuated so as to deflect side wall 304 downwardly and thus move the uppermost tire bead 306 off of rim seat 32 until there is sufficient room between bead 306 and rim seat 32 to manually install tool 260 into the bead holding position illustrated in FIG. 12. Tool 260 is clamped in this position by attaching clamp block 284 with studs 286,288 as described previously. When so fixtured, tool 260 is effective to maintain the adjacent portion of tire bead 306 deflected away from rim seat 32 and towards the center of the rim. Boom 300 is then retracted clear of the tire, and the tire and rim assembly inverted, preferably using suitable hoist attachments associated with power boom 300, so that side wall 304 rests freely on floor 42 as shown in FIG. 13.

Figure 14:
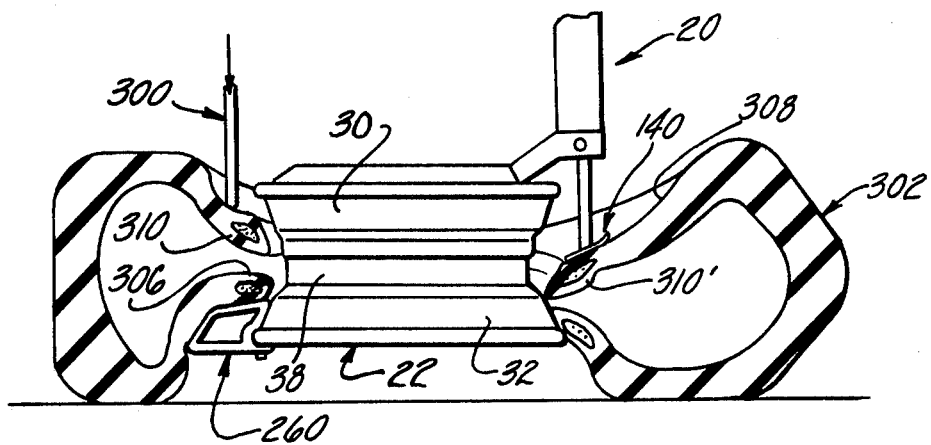
Figure 15:
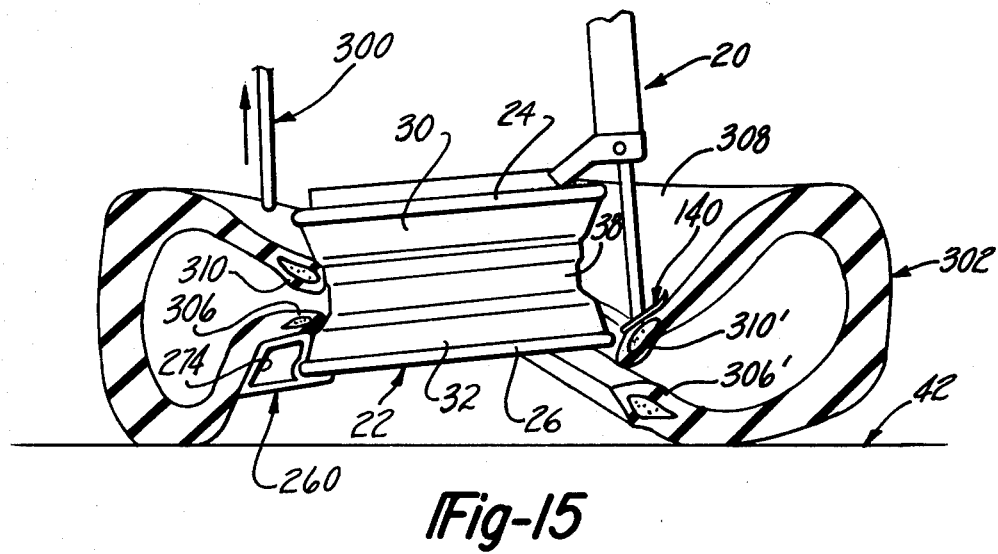

The next step is to fixture tire dismounting tool 20 onto rim 22, as described previously in conjunction with dismounting of bias tire 40. Then, power boom 300 is again operated to engage the now upwardly facing side wall 308 of tire 302 at a location aligned axially of the tire and rim with tool 260. A downward pressing force is exerted by boom 300 to shift the subjacent portion of bead 310 downwardly from its position shown in FIG. 13 to the displaced position thereof shown in FIG. 14. The portions of beads 306 and 310 engaged respectively by tool 260 and boom 300 are now both held off of rim seats 32 and 30 respectively and in general registry with the drop center portion 38 of rim 22. Tool 20 is then actuated to begin forcing shoe 140 downwardly on its working stroke so as to force a portion 310' of the upper tire bead, diametrically opposite boom 300, downwardly off of rim seat 30. Once upper bead portion 310' has been deflected by tool 20 into general registry with drop center portion 38, as indicated in FIG. 14, power boom 300 is retracted upwardly clear of the tire as indicated in FIG. 15. The portion 310 of the upper tire bead previously engaged by boom 300 will remain in the displaced position shown in FIG. 14, even though pressure from the boom has been removed, due to the restraining force exerted by shoe 140 when the same has reached its FIG. 14 position. Preferably, downward movement of shoe 140 is halted temporarily while removing boom 300 from engagement with the tire.

Figure 16:
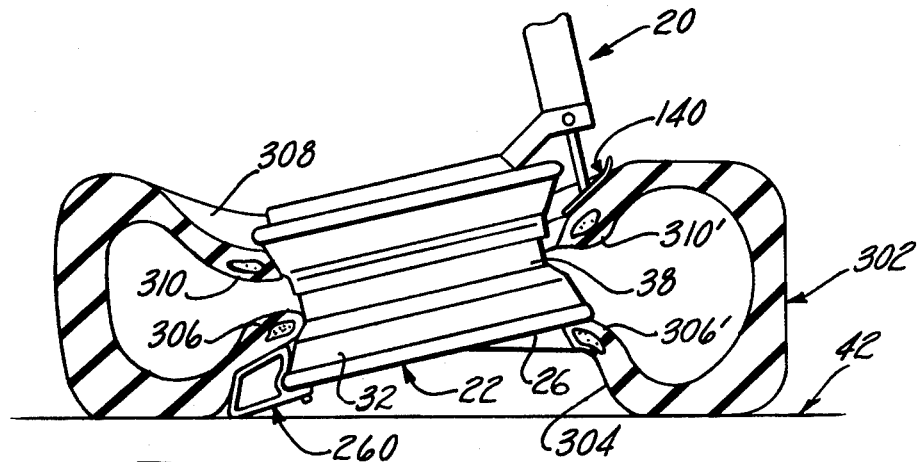

Tool 20 is then operated so as to move shoe 140 downwardly until the tire bead portion 310' engages the facing portion of 306' of the lowermost tire bead and forces the same over the adjacent rim flange 26 as illustrated in FIG. 15. As the lower tire bead portion 306' is thus stretched, the diametrically opposite portion 306 will slide up tool 260 toward the drop center 38 so as to accommodate buttonhooking of the lowermost tire bead over rim flange 26. This condition of the lower tire bead is illustrated in FIG. 16 wherein the lower half 306' of the tire bead is buttonhooked off of rim 22 and thus able to assume a relaxed, generally unstressed condition, with the bead portion 306 adjacent tool 260 nesting into the drop center portion 38 of the rim. Tool 20 can then be operated to partially retract shoe 140 to the position thereof shown in FIG. 16 to temporarily relieve some of the stress imposed on tire side wall 308.

With rim 22 thus tilted upwardly from floor 42 (FIG. 16), the operator next reaches through the rim 22 and unbolts studs 266 and 268 and slides clamp block 284 free of tool 260 and the rim. Then tool 260 is hammered sideways to free the same from between tire side wall 304 and rim seat 32, whereupon tool 260 may likewise be removed from the tire and rim. Removal of tool 260 at this point in the procedure, with tool 20 still exerting deflecting force on the tire, will not materially alter the positional relationship of the lower tire bead 306,306' relative to rim 22. Such removal of tool 260 is necessary at this point so that it does not interfere with subsequent removal of the second, upper bead 310,310' from rim 22.

Figure 17:
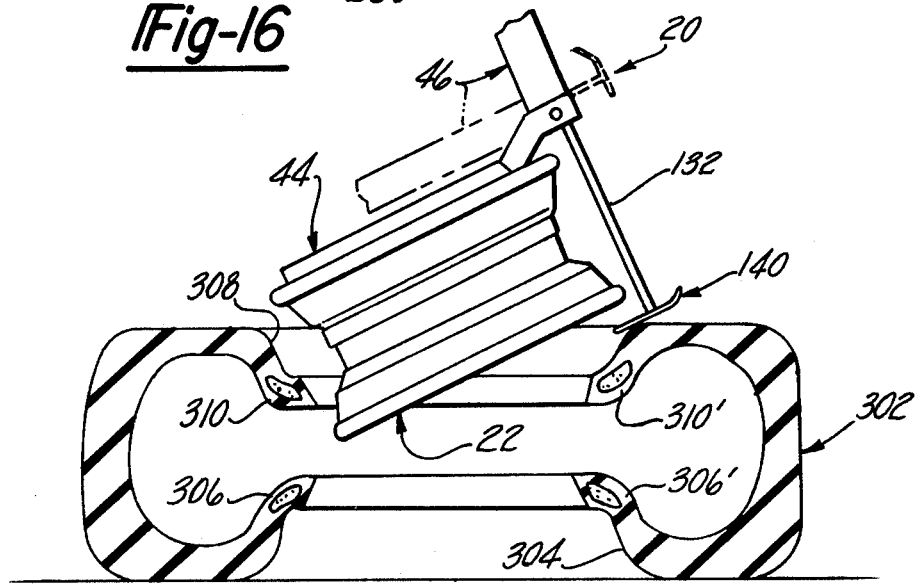

Referring to FIGS. 16 and 17, the next step in the dismounting of tire 302 is to again operate tool 20 to fully extend piston rod 132 on its working stroke. This pushes upper bead portion 310' over the rim flange 26 in a second buttonhooking operation. As this occurs, lower flange 26 of rim 22 is lifted clear of lower bead 306,306' so as to rest loosely on upper bead 310,310'. Rim 22 and tool 20 have now assumed the same stage relative to tire 302 as described previously in conjunction with the operation of tool 20 relative to bias tire 40 in FIG. 10. Accordingly, the final steps of retracting tool 20 and removing the same from the rim are repeated as described previously in conjunction with tire 40.

Although tires of radial construction thus require the provision of bead positioning tool 260 and the assistance of power boom 300 to accomplish dismounting of the tire using the tool and method of the invention, along with the additional manipulative steps described in conjunction with FIGS. 12 through 16, these additional measures are not considered to be a practical impediment. Bead positioning tool 260 is a relatively simple and inexpensive fixture which is readily attachable and detachable from the rim. Likewise, the need to use boom 300 to successfully deflect tire side walls 304 and 308, although slightly prolonging the tire dismounting cycle time, does not ordinarily require additional capital investment inasmuch as appropriate powered implements of this nature are already available in the field and service shops since such equipment is required in any event in order to lift the giant tires and off-highway rims during servicing of the same.

By way of working example, tool 20 has been successfully operated to dismount giant tubeless tires from single-piece 15° off-highway rims under the following specifications and conditions:

| Tire & Make | Size | Construction Type |
|---|---|---|
| Goodyear | 27.00 × 56.5 | Bias |
| Goodyear | 30.00 × 56.5 | Bias |
| Goodyear | 30.12 × 56.5 | Radial |
| Goodyear | 33.00 × 59.5 | Bias |
| Goodyear | 39.00 × 59.5 | Bias |

| Make | Rims Size | Weight (lbs.) |
|---|---|---|
| Firestone | 20.00 × 56.5 | 1046 |
| Goodyear | 20.00 × 56.5 | 1200 |
| Firestone | 22.00 × 56.5 | 1240 |
| Goodyear | 22.00 × 56.5 | 1250 |
| Firestone | 23.5 × 59.5 | 1830 |
| Firestone | 27.00 × 59.5 | 2032 |

Tool Weight - 330#
Time Cycle 1st & 2nd Bead = 4 min.
No. of Personnel - 1
Max. Bead Width 56.5 Dia. = 4.70
Max. Bead Width 59.5 Dia. = 7.4"

From the foregoing description, it will be apparent that the improved tire dismounting method and apparatus of the present invention fulfills the aforementioned objects in a relatively simple, efficient and economical manner. Moreover, it will now be evident that the invention provides a significant step forward in rendering one piece rims and tubeless tires practical for use in the so-called giant, off-highway tire field, where the convenience of this type of rim and tire has hitherto found only limited acceptance both because of the difficulty in dismounting such tires and the corresponding complexity, size and cost of the tire dismounting equipment of the prior art.

I claim:

1. In the use of that type of tire dismounting machine which dismounts a tire casing from a wheel rim wherein the rim has first and second axially spaced tire-bead-retaining flanges, first and second annular bead seating areas respectively inwardly adjacent to said first and second flanges, and a sloping-walled drop center portion therebetween, the machine being of the type having a frame mounted against one side of the rim and a bead deflector ram mounted adjacent the first rim flange with a presser shoe disposed radially outwardly adjacent said first rim flange so as to commence travel generally axially of the rim across the rim flanges, the method, utilized when the tire is deflated and its two tire beads are seated on their rim seats, of dismounting the tire beads over the second flange, comprising the steps of:

(a) orienting said machine and rim with the axis of said ram generally parallel to that of said rim and with said bead deflector shoe in a retracted position generally adjacent said first rim flange, (b) commencing the power stroke of said ram to cause said bead deflector shoe to engage the tire sidewall associated with the one of said tire beads adjacent said first rim flange to unseat said one bead from said first seat and move said one bead axially of the ram toward said second bead;

(c) continuing said power stroke to cause said bead deflector shoe to progressively deflect said one bead into engagement with said second bead to force the latter over the second rim flange during substantially the full stroke of said ram;

(d) continuing the progression of the bead deflector shoe during the final portion of its travel whereby to lift the rim second flange past said one bead to complete the deflection of both beads over the second flange of the rim;

(e) at least during the performance of steps (b), (c) and (d) simultaneously holding said tire dismounting machine fixed against movement axially relative to said rim while permitting said ram to pivot bodily generally about an axis perpendicular to that of the rim and generally tangential to said first rim flange; and (f) thereafter removing the tire dismounting machine from said rim.

2. The method as set forth in claim 1 wherein said machine is held adjacent the rim by fixturing said machine to the diametrically opposite portions of the adjacent side edge of said one side of said rim.

3. The method set forth in claims 1 or 2 wherein step (e) is performed by allowing said ram to pivot through a predetermined angular range while propelling said shoe, said range being defined by the movement of the ram axis between end limits generally parallel to the axis of said rim and an acute angle intersecting the rim axis at a point on the same side of the rim and spaced from said one side of said rim.

4. The method set forth in claim 3 wherein said bead deflector shoe is pivotally supported on the working end of a piston rod of said ram.

5. The method set forth in claim 4 wherein said pivotal range of said ram is approximately 15°.

6. The method of claim 5 wherein said ram is yieldably spring biased toward that end limit of its pivotal travel generally parallel to the rim axis.

7. The method set forth in claims 1 or 2 wherein the tire is supported in a free, unfixtured condition with the tire wall associated with said second tire bead resting on a flat, generally horizontal supporting surface throughout the performance of steps (a) through (f) of claim 1.

8. The method set forth in claims 1 or 2 for use with giant tires of radial-type construction, comprising the further steps of:
  (g) displacing a portion of the other of the two tire beads from the rim second flange prior to the mounting of the tire dismounting machine on the rim,
  (h) positioning said displaced portion of said other tire bead to hold the same off said second rim seat by fixturing a tire bead positioning tool between said other bead and said second rim seat;
  (i) placing the tire and rim assembly on a generally horizontal supporting surface in a free, unfixtured condition with the tire side wall associated with said other bead resting on said supporting surface;
  (j) displacing said one tire bead axially of the rim to force the same off of said first rim bead seat and toward the drop center region of the rim;
  (k) temporarily holding said one tire bead in said displaced position established in step (j);
  (l) performing steps (a) and (b) of claim 1 with said shoe positioned diametrically opposite of the rim from said bead positioning tool;
  (m) thereafter releasing the holding force applied in step (k) and thereafter performing step (c) of claim 1;
  (n) thereupon removing the bead positioning tool from engagement with the rim and tire; and
  (o) thereafter performing steps (d), (e) and (f) of claim 1.

9. The method set forth in claims 1 or 2 wherein said first flange of said rim has a re-entrant lip extending radially inwardly of the rim from said first flange and extending circumferentially around the rim, comprising the further step of:
  (g) mounting said machine on said rim by fixturing the frame of said machine with the same engaging said rim flange lip at diametrically opposite portions thereof so as to restrain the frame against movement axially of the rim.

10. A tire dismounting machine for use in dismounting a tire casing from a wheel rim wherein the rim has first and second axially spaced tire-bead retaining flanges, said machine comprising a frame adapted to extend diametrically of the rim to span one side thereof adjacent said first flange, said frame having fixturing means adapted to engage diametrically opposite portions of said first rim flange to restrain movement of said machine axially relative to the rim, and a ram pivotally supported on said frame adjacent one longitudinal end thereof for orientation of the ram with its axis generally parallel to the rim axis in operation of said ram, said ram having a piston with a presser shoe carried on the free end of the piston for movement in a travel path radially outwardly of and adjacent said rim flanges and generally parallel to the axis of the rim through a working stroke extending axially beyond said second rim flange, said frame including means supporting said ram for pivotal motion such that the ram axis can move through a range of about 15°, the end limits of said range being generally parallel to the axis of the rim and an acute angle intersecting the rim axis on the same side of the rim to which said machine is fixtured, means supporting said ram on said frame and operable to yieldably bias said ram toward that end limit of its travel generally parallel to the rim axis, said ram biasing means comprising spring means operably coupled between said ram and said frame for exerting a constant biasing force on said ram, and abutment arm means coupled between said spring means and said ram for transmitting the spring biasing forces to said ram, said abutment arm means being movably connected to said machine whereby said ram may be pivoted to a storage position with its axis oriented generally parallel to the longitudinal axis of said machine frame.

11. The machine as set forth in claim 10 wherein said frame comprises a hollow tubular member having a lengthwise dimension somewhat less than that of the inside diameter of the first flange of the rim, and wherein said ram supporting means includes a cylinder of said ram having said ram piston and arm means at one longitudinal end of said tubular member protruding therebeyond and including pivot means pivotally connected to and supporting one end of said ram cylinder, said spring means including a floating plate supported between said arm means for movement in the plane of pivotal movement of the axis of said ram, said abutment arm means comprising a V-shaped bracket having an apex resting on said floating plate and a pair of divergent legs removably connected to said one end of said ram cylinder.

12. The machine as set forth in claim 10 wherein said frame includes a pair of outriggers mounted to said frame for swinging movement from a retracted position adjacent said frame to an extended position wherein said outriggers are adapted to rest upon the first flange of the rim.

13. The machine as set forth in claims 11 or 12 including flexible retaining means mounted on said frame near the end thereof remote from said ram and adapted to encircle the ram in the collapsed position thereof to secure the same adjacent said frame.

14. The machine as set forth in claim 11 wherein said frame fixturing means includes a fixturing block mounted to said tubular member adjacent the end thereof remote from said ram, said block having first and second notch means at the opposite longitudinal ends thereof each adapted to engage the rim flange, said block being mounted for pivotal movement to alternatively engage said first and said second notch means with the rim flange, said first and second notch means having a predetermined different spacing from the pivot axis of said block such that said frame may be fixtured to two different predetermined diametrical sizes of rims.

* * * * *